United States Patent
Hölter et al.

(10) Patent No.: US 8,697,213 B2
(45) Date of Patent: Apr. 15, 2014

(54) PHOTODEGRADABLE PLASTICS MATERIAL AND ITS USE

(75) Inventors: Dirk Hölter, Emmendingen (DE); Wolfgang Koppe, Au (DE)

(73) Assignee: SOLVAY ACETOW GmbH, Freiburg (DE)

( * ) Notice: Subject to any disclaimer, the term of this patent is extended or adjusted under 35 U.S.C. 154(b) by 95 days.

(21) Appl. No.: 13/058,947

(22) PCT Filed: Aug. 13, 2009

(86) PCT No.: PCT/EP2009/005888
§ 371 (c)(1), (2), (4) Date: Feb. 14, 2011

(87) PCT Pub. No.: WO2010/017989
PCT Pub. Date: Feb. 18, 2010

(65) Prior Publication Data
US 2011/0143067 A1 Jun. 16, 2011

(30) Foreign Application Priority Data
Aug. 14, 2008 (EP) .................................... 08014544

(51) Int. Cl.
- B32B 1/00 (2006.01)
- B32B 1/02 (2006.01)
- A24D 3/06 (2006.01)
- C08K 3/22 (2006.01)
- B01D 39/04 (2006.01)
- B01D 39/16 (2006.01)

(52) U.S. Cl.
USPC ....... 428/36.4; 428/34.1; 428/34.2; 428/34.4; 428/35.7; 428/36.92; 524/424; 524/497; 524/847; 131/345; 55/528

(58) Field of Classification Search
USPC ........... 428/34.1–34.5, 34.8, 35.2, 35.5, 35.7, 428/36.4, 36.9, 36.92; 131/331, 332, 131/341–343, 345; 493/39, 42, 47–50; 55/528; 524/430, 497, 847, 424
See application file for complete search history.

(56) References Cited

U.S. PATENT DOCUMENTS

| | | | |
|---|---|---|---|
| 4,022,632 A | 5/1977 | Newland | |
| 5,491,024 A | 2/1996 | Brodof et al. | |
| 5,804,296 A * | 9/1998 | Itoh et al. | 428/326 |
| 6,776,168 B1 | 8/2004 | Teufel et al. | |
| 7,238,419 B2 * | 7/2007 | Kern et al. | 428/328 |
| 2005/0227854 A1 | 10/2005 | Orth-Gerber et al. | |

FOREIGN PATENT DOCUMENTS

| | | |
|---|---|---|
| CN | 1132220 C | 12/2003 |
| CN | 1930250 B | 5/2011 |
| EP | 0 716 117 A | 6/1996 |
| WO | WO 95/29209 A | 11/1995 |
| WO | WO 2005/108505 A | 11/2005 |
| WO | WO 2007/141342 A | 12/2007 |

OTHER PUBLICATIONS

PCT Search Report for PCT/EP2009/005888, Dec. 10, 2009.
First Office Action and Search Report for Corresponding CN 20098012863.19, Oct. 23, 2012.

* cited by examiner

*Primary Examiner* — Walter B Aughenbaugh

(57) ABSTRACT

A photodegradable plastic is described, comprising cellulose esters and also, if appropriate, additives. A particular characterizing feature of this photodegradable plastic is that it comprises a dispersed photocatalytic carbon-modified titanium dioxide. Comparative experiments show that this photodegradable plastic exhibits a surprisingly high increase in photocatalytic degradability when compared with products in which a conventional or other modified titanium dioxide is used. This improvement is apparent in particular in use of the photodegradable plastic according to the invention when it is further processed to give moldings. The photodegradable plastic can, for example, first be further processed to give a filter tow. This can be used to produce filter rods, and these can then be used to produce filter plugs for filter-tip cigarettes.

25 Claims, 2 Drawing Sheets

Figure 1:
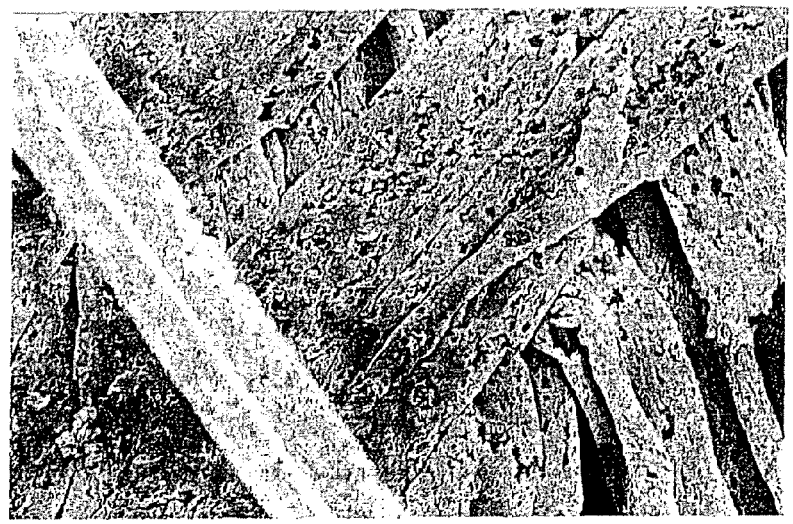

Filaments according to Example 2 after 16 weeks of an outdoor test
(SEM, 1,000 times magnification)

Filaments according to Example 4 after 16 weeks of an outdoor test (SEM, 1,000 times magnification)

PHOTODEGRADABLE PLASTICS MATERIAL AND ITS USE

The invention relates to a photodegradable plastics material with a content of cellulose esters and optionally additives as well as its use, especially in filter tows for producing filter plugs for filter cigarettes.

Plastics materials, which reach or may reach the environment at the end of their life cycle, should be degradable within short time periods under the conditions prevailing there in order to keep their impact as small as possible. However, even in the case of plastics materials, which are biologically degradable in principle, the time period of their decomposition depends strongly on the external conditions. Thus, degradation is more rapid under composting conditions than in soils also containing microorganisms. The biodegradation is significantly longer when the conditions for the microorganisms necessary for this are inadequate. This is the case if the corresponding plastics material lies completely or partially on a surface, for example stone slabs, asphalt, sand, earth or grass. Under these conditions, other or additional degradation mechanisms are necessary. In these cases, photocatalytic decomposition under the action of light is especially suitable. This may be the only mechanism for complete degradation of the material, but may also have a supporting action for other degradation mechanisms.

It has been known for a long time that titanium dioxide, especially in the anatase modification, can decompose by the photocatalytic action of organic materials. Anatase absorbs light in the ultraviolet range of the spectrum, radicals, which initiate a degradation brought about by a chain mechanism, being produced by the following electron transmissions. This degradation of materials is generally damaging to their function. Therefore, work was firstly substantially carried out to stabilise materials containing titanium dioxide. Reference is made with regard to this work to U.S. Pat. No. 2,206,278, GB 780,749 and U.S. Pat. No. 3,961,975.

DE 24 36 260 C1 describes the use of titanium dioxide pigments with a small particle diameter for the targeted degradation of plastics material compositions under the influence of weather and/or light. CA 1073581 discloses the use of titanium dioxide particles for the photocatalytic degradation of polyolefins.

More work was put into the degradation of cellulose esters and filter tow produced therefrom in the environment as a result of increased public focus in the 1990s on the continued existence of plastics materials after fulfilling their purpose of use.

The addition of titanium dioxide pigments to cellulose esters for the purpose of matting has been prior art for a long time, which U.S. Pat. No. 2,206,278 addresses.

WO-A-93/24685 deals with the accelerated degradation of cellulose esters with the addition of photocatalytically effective titanium dioxide pigments. In a comparison of conventionally used titanium dioxide pigments, which are equipped with a coating reducing the photocatalytic effect, with uncoated anatase, a moderately accelerated decrease in the tensile strength was produced in the weatherometer test for single threads made of cellulose acetate compositions with uncoated anatase. Anatase pigments, the surface of which had been treated with Ba/Ca sulphates or phosphates, were also used, with the aim of further increasing the photocatalytic effect. An increased release of acetic acid in an acetonic solution of cellulose acetate was found with these pigments.

EP 716 117 A1 describes cellulose ester compositions with anatase. The surface of the titanium oxide was partially treated with phosphoric acid salts, other phosphorous compounds, polyalcohols, amino acids or their salts. An acceleration of the decrease in tensile strength was determined in the fadeometer test on filaments from the corresponding cellulose acetate comp ions compared to untreated anatase pigments, but this was clearly below a doubling. The cellulose acetate used in the examples had a degree of substitution DS of 2.14 and was therefore significantly below the DS of cellulose esters used as standard.

U.S. Pat. No. 5,491,024 and U.S. Pat. No. 5,647,383 describe the addition of ultra fine titanium dioxide particles to cellulose esters. A moderate acceleration was produced here in the weatherometer test on individual threads in the decrease in tensile strength in comparison to conventional titanium dioxide pigments.

The results described to date, which were achieved by various modifications of the titanium dioxide, are unsatisfactory with regard to a significant acceleration in the degradation rate of cellulose ester compositions. No decisive improvement can be seen. This applies all the more since the loss of mass of a material during its decomposition generally takes place substantially more slowly than the loss of mechanical strength, which emerges from N.-S. Hon, J. Polym. Sci. 15, 1977, 725-714. Sakthivel and Kisch, Angew. Chem., Ind. Ed. 42 (2003), 4908 describe a titanium dioxide volume-doped with carbon. This also exhibited, apart from in the UV range, a clear absorption in the visible range. WO 2005/108505 describes a $TiO_2$, which is doped with carbon on the surface and also absorbs light in the visible range. Owing to the increased photocatalytic activity, organic contaminants and impurities on material surfaces are to be degraded. Thus, carbon-modified or carbon-doped (lacuna) are already known to the person skilled in the art from the prior art.

The prior art outlined below does not lead to desirable improvements either: according to WO-A-95/29209, a surface treatment of titanium dioxide particles takes place, for example with silicon dioxide, aluminium oxide and/or an organic compound, such as trimethylol. This is to prevent the agglomeration of titanium dioxide particles. According to U.S. Pat. No. 4,022,632, titanium dioxide particles are treated with a special salt. WO 2007/141342 A proposes providing titanium dioxide particles with one or more layers of organic substances, it being possible to use, for example, polyglycols, carboxylic acids, alkali salts of carboxylic acids, multi-valent alcohols, trimethylolethane, pentaerythritol or neopentyl glycol.

Proceeding from the prior art outlined above, the invention was based on the aim of proposing a photodegradable plastics material with a content of cellulose esters and optionally additives, which is distinguished by a significantly increased photodegradation under environmental conditions. Moreover, the invention has the aim that this photodegradable plastics material should be advantageously used as a mould body, especially in a filter tow for producing a filter plug for a cigarette filter.

According to the invention, this aim is addressed by a photodegradable plastics material of the type described at the outset in that the photodegradable plastics material contains a photocatalytically active carbon-modified titanium dioxide dispersed therein, and this, especially, in a finely dispersed form.

Advantageous configurations of the teaching according to the invention emerge from the sub-claims 2 to 18.

The invention is not subject to any critical restrictions in the selection of the cellulose ester. Especially preferred are cellulose acetate, cellulose propionate, cellulose butyrate, cellulose acetate propionate and/or cellulose acetate butyrate. The invention is not relevantly restricted either with regard to the average of substitution (DS) of the cellulose ester prepared according to the invention. The average degree of substitution (DS) is preferably between 1.5 and 3.0, especially between 2.2 and 2.7, this especially being the case with the cellulose acetate. It is expedient if the cellulose ester, especially cellulose acetate, is optimised with regard to the average degree of polymerisation with regard to an advantageous achievement of the aim posed. The optimal average degree of polymerisation in the cellulose ester is between 150 and 500, especially between 180 and 280.

It has surprisingly been found through the addition of a carbon-modified titanium dioxide, especially a carbon-doped titanium dioxide, in cellulose ester compositions, that the latter can be photocatalytically degraded in the environment at a previously unknown speed. The time reduction in the mass of the photodegradable plastics material is selected as the measurement variable, as expressed by the following examples. The core of the invention is therefore the selection of a carbon-modified titanium dioxide, which is carbon-modified on its surface or else in the entire volume. A carbon-modified titanium dioxide, the surface of which is carbon-doped, is preferred. The band gap of the semiconductor titanium dioxide is reduced by the doping and, in comparison to undoped titanium dioxide, longer-wave light can also be used to excite a valence band electron and therefore to activate the photocatalytic properties.

The crystallite size of the carbon-doped titanium dioxide is expediently optimised, the crystallite size preferably being between 5 and 150 nm, especially between 7 and 25 nm. In an individual case, it may be advantageous or even necessary to grind a conventional commercial coarse-particle carbon-modified titanium dioxide in order to adjust the optimal grain size. Expediently, the carbon-modified titanium dioxide has a density (ISO 787, Part 10) of 3.0 to 5.0 g/cm$^3$, especially of 3.5 to 4.2 g/cm$^3$. An optimisation of the specific surface of the carbon-modified titanium oxide also has an advantageous effect on the degradation of the cellulose ester-containing plastics material. It is preferred here if the specific surface BET of the carbon-doped titanium dioxide is greater than 100 m$^2$/g, especially greater than 250 m$^2$/g. The incorporation of a carbon-modified titanium dioxide in the photodegradable plastics material according to the invention has an especially advantageous effect when the carbon-modified titanium dioxide is characterised by a significant light absorption compared to pure titanium dioxide in the range of $\lambda \geq 400$ nm.

In order to further improve the photodegradability of the plastics material according to the invention it is expedient to adjust the content thereof of carbon-modified titanium to 0.1 to 5% by weight, especially to 0.3 to 1.5% by weight.

The carbon content of the carbon-modified titanium dioxide is not significantly restricted. The carbon-modified titanium dioxide preferably contains carbon in a quantity of 0.05 to 5% by weight, especially from 0.3 to 1.5% by weight.

It is possible according to the invention for the photodegradable plastics material to be substantially not based only on cellulose esters. Conventional additives such as, for example, plasticisers may be included, for example in the case of use in fibres of the filter materials for cigarettes.

On the other hand, in addition, a non-carbon-modified titanium dioxide, especially anatase, may be included in a fine dispersion, especially in the case of the application relating to the cigarette industry. In order to as far as possible follow the ideas according to the invention and to use the special photocatalytic effectiveness of the carbon-modified titanium dioxide in the degradation of a plastics material, it is preferred for the cellulose ester content of the photodegradable plastics material of to make up at least 60% by weight, especially at least 90% by weight.

The especially excellent photodegradability of the plastics material according to the invention, as shown by the following examples, is shown, especially, when the photodegradable plastics material is transformed into a moulded body, especially fibres, films, especially deep-drawn films, above all for use as packaging materials, for injection-moulded articles, thick-walled moulded bodies, granulates, microbeads, beads and vessels. The further processing of these fibres into filter tows is especially advantageous, with which filter rods and filter plugs made therefrom for filter cigarettes are produced. Filter plugs of this type, which are found in the environment, are degraded significantly faster with the action of light than those, which are not designed according to the invention.

An especial advantage of the invention is that the product according to the invention, as the following examples show, exhibits a superiority not to be expected during photocatalytic degradation in comparison to the comparative samples. Thus, the degradation rate in a 36 week period in filter plugs (weight decrease after deduction of the water-soluble fractions of ~6% by weight) is, for example, more than 3 times higher compared to the best example 5 (comparative Example 3) (uncoated anatase). The superiority of the product according to the invention is even more significant when compared with a comparative produce which does not contain any titanium dioxide. A substantial superiority is likewise determined when an $SiO_2/A_2O_3$-coated anatase is used for comparison.

Figure 2:
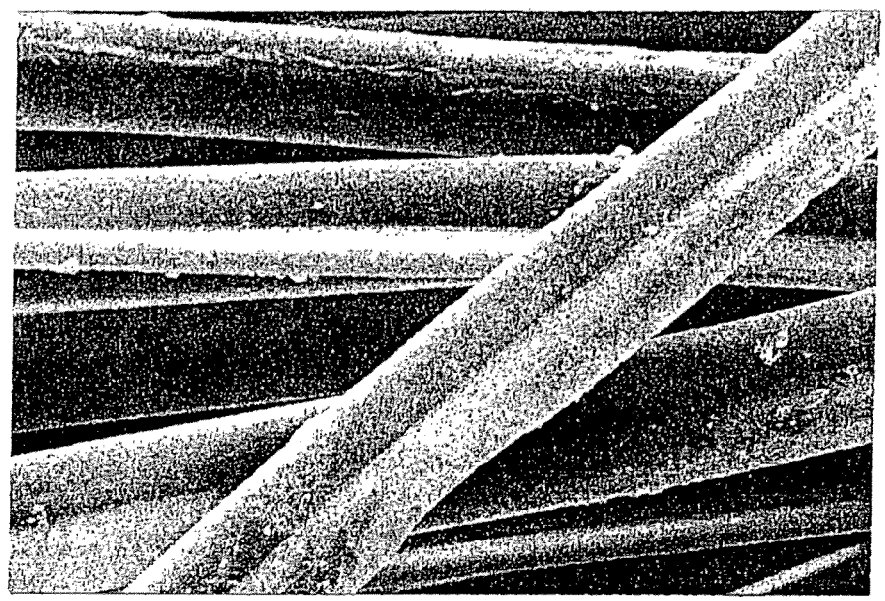

The superior photodegradation which is achieved according to the invention also emerges with good agreement from the accompanying FIGS. 1 and 2.

FIG. 1 shows an SEM image of the filaments of the test sample 1 according to Example 2 after 16 weeks outdoor test (1,000 times magnification), while FIG. 2 shows filaments according to Example 4 (comparative Example 2) in an SEM image after 16 weeks of an outdoor test (also 1,000 times magnification). The photodegradable plastics material according to the invention shows a coarse fissure and broken filaments and therefore a good degradation result, which does not apply to Example 4 used for comparison. A smooth surface of the filaments can instead be determined here.

Finally it is noted that the method for producing the photodegradable plastics material according to the invention is not subject to any especial restrictions. One possibility is mixing the individual components in that the plastics material is melted and the relevant components are mixed in. The fibres are expediently produced by the dry spinning method, even if the wet spinning method can also be considered. In the dry spinning method, the cellulose ester is preferably dissolved in the conventional manner, for example in acetone. The relevant further constituents, such as, especially, the carbon-modified titanium dioxide, are then added in order to then carry out the conventional spinning process in a drying channel.

The invention will be described in more detail below with the aid of examples:

EXAMPLE 1

General Mode of Production

Production of the titanium dioxide suspension: 15% titanium dioxide in acetone with 3% cellulose acetate to stabilise the suspension is ground by a bead mill (WAB dynomill multilab, 1.4 l grinding volume) with a throughput of 8.5 kg/h to a particle size of D50=1.2 μm.

Three different titanium dioxide types are used, as the following Table 1 shows.

TABLE 1

| Type | Crystal modification | Inorganic surface treatment | Oil absorption value (ISO 787/5) |
|---|---|---|---|
| A | Anatase | Carbon doping | ~50 |
| B | Anatase | $SiO_2/Al_2O_3$ | 20 |
| C | Anatase | none | 20 |

Production of the spinning solution: 26 parts by weight of a cellulose acetate with a DS of 2.45 are dissolved in 74 parts of a solvent mixture of acetone/water 96:4. In the case of a titanium dioxide addition, 1.73% by weight titanium oxide suspension is added to this solution. The spinning solution thus produced is homogenised and then filtered.

Production of the threads: 3.0 denier filaments are produced from the spinning solution by the dry spinning method.

Production of the filter rods: the cellulose acetate threads formed are combined into a band, crimped with a stuffer box crimping machine and dried. The specification of the filter tow thus produced is 3 Y 35000. This specification designation means:

Filament titre: 3.3 dtex
Total titre: 38,500 dtex
Cross-sectional shape of the filaments: Y The filter tow is processed on a filter rod machine to form filter rods with the length 126 mm and a diameter of 7.8 mm. The quantity of triacetin provided here is 6% of the total weight.

EXAMPLE 2

Invention

Titanium dioxide Type A is added to the spinning solution by the method described in Example 1 in the ratio 1:99, based on cellulose acetate.

EXAMPLE 3

Comparative Example 1

As Example 1, but without the addition of titanium dioxide.

EXAMPLE 4

Comparative Example 2

As Example 2, but with the addition of titanium dioxide Type B.

EXAMPLE 5

Comparative Example 3

As Example 2, but with the addition of titanium dioxide Type C.

EXAMPLE 6

Test Method and Implementation of an Outdoor Test

Test Sample 1:
The test samples are produced in that the threads each with 840 filaments are crocheted in such a way that the individual samples have a weight of around 0.3 g each with an area of about 3.5×1.3 cm each. The test samples thus produced, in comparison to individual filaments or the threads described as conventional made of <200 filaments (cf. cited patent specifications) have higher material thicknesses as well as, additionally, material overlays, which are penetrated by light with more difficulty, and can also not disintegrate so easily in the outdoor test.

Test Sample 2:
The test samples are produced in that the paper of the filter rod (produced according to Example 1) is removed and the remaining filter rod is cut into filter plugs with a 21 mm length.

Implementation of the Test:
The test samples are placed outdoors in cages. The cages comprises a metal woven fabric with an 85% open area and a base slab made of concrete. The cages are set up outdoors such that, apart from the influence of the wire woven fabric, the sunlight can shine in unhindered and other weather influences can also have an effect. To distinguish the samples, the cages are divided into individual chambers. The test samples of one material are in each case distributed over various cages in order to be able to exclude possible local influences.

The test samples are removed every 4 weeks, freed of coarse adhering substances, conditioned for 24 h at 20° C. and 60% air humidity and then weighed. The outdoor tests were carried out in Freiburg i. Br. (Germany). Table 2 shows the results for test samples 1, carried out under primarily summer conditions, Table 3 for the test samples 2, mainly under winter conditions.

TABLE 2

(Weight reduction (% by weight) of test samples 1 in the outdoor test on concrete as a function of time)

|  | 4 weeks | 8 weeks | 12 weeks | 16 weeks |
|---|---|---|---|---|
| Example 2 | 3.7 | 8.0 | 14.5 | 21.5 |
| Example 3 | 0.6 | 0.5 | −0.2 | −0.4 |
| Example 4 | 1.5 | 1.5 | 1.1 | 0.9 |
| Example 5 | 2.5 | 3.9 | 5.3 | 7.1 |

TABLE 3

(Weight reduction (% by weight) of test samples 2 in the outdoor test on concrete as a function of time)

|  | 12 weeks | 20 weeks | 28 weeks | 36 weeks |
|---|---|---|---|---|
| Example 2 | 8.7 | 10.6 | 14.5 | 24.2 |
| Example 4 | 6.2 | 6.0 | 6.7 | 7.2 |
| Example 5 | 7.2 | 7.9 | 9.4 | 11.3 |

Note:
The samples (filter plugs) already lose between 6 and 7% by weight at the start of the test due to the release of the water-soluble constituents.

The invention claimed is:

1. A photodegradable plastics material with a content of cellulose esters and optionally additives, characterised in that the photodegradable plastics material contains a photocatalytically active carbon-modified titanium dioxide dispersed therein; and the photodegradable plastics material contains 0.1 to 5% by weight carbon-doped titanium dioxide.

2. A photodegradable plastics material according to claim 1, characterised in that the cellulose ester is cellulose acetate, cellulose propionate, cellulose butyrate, cellulose acetate propionate and/or cellulose acetate butyrate.

3. A photodegradable plastics material according to claim 1, characterised in that the cellulose ester has an average degree of substitution (DS) of 1.5 to 3.0.

4. A photodegradable plastics material according to claim 1, characterised in that the cellulose ester has an average degree of polymerisation of 150 to 500.

5. A photodegradable plastics material according to claim 1, characterised in that it additionally contains a non-carbon-modified titanium dioxide.

6. A photodegradable plastics material according to claim 1, characterised in that the carbon-modified titanium dioxide has a crystallite size of 5 to 150 nm.

7. A photodegradable plastics material according to claim 1, characterised in that the carbon-modified titanium dioxide has a density (ISO 787, Part 10) of 3.0 to 5.0 g/cm$^3$.

8. A photodegradable plastics material according to claim 1, characterised in that the specific surface area (to BET) of the carbon-modified titanium dioxide is greater than 100 m$^2$/g.

9. A photodegradable plastics material according to claim 1, characterised in that the carbon-modified titanium dioxide is characterised by a greater light absorption compared to pure titanium dioxide in the range of $\lambda \geq 400$ nm.

10. A photodegradable plastics material according to claim 1, characterised in that the carbon-modified titanium dioxide has a carbon content of 0.05 to 5% by weight.

11. A photodegradable plastics material according to claim 1, characterised in that a content of cellulose ester makes up at least 60% by weight.

12. A photodegradable plastics material according to claim 1, as a moulded body in a form selected from fibres and films.

13. A photodegradable plastics material according to claim 12, characterised in that the fibres are constituents of a filter tow.

14. A photodegradable plastics material according to claim 3, wherein the cellulose ester is cellulose acetate.

15. A photodegradable plastics material according to claim 3, wherein the average degree of substitution is within the range of 2.2 to 2.7.

16. A photodegradable plastics material according to claim 4, wherein the average degree of polymerization is within the range of 180 to 280.

17. A photodegradable plastics material according to claim 5, wherein the non-carbon-modified titanium dioxide is anatase.

18. A photodegradable plastics material according to claim 6, wherein the carbon-modified titanium dioxide has a crystallite size of 7 to 25 nm.

19. A photodegradable plastics material according to claim 7, wherein the density (ISO 787, Part 10) is within the range of 3.5 to 4.2 g/cm$^3$.

20. A photodegradable plastics material according to claim 8, wherein the specific surface area (to BET) of the carbon-modified titanium dioxide is greater than 250 m$^2$/g.

21. A photodegradable plastics material according to claim 1, wherein the photodegradable plastics material contains 0.3 to 1.5% by weight carbon-doped titanium dioxide.

22. A photodegradable plastics material according to claim 10, wherein the carbon-modified titanium dioxide has a carbon content of 0.3 to 1.5% by weight.

23. A photodegradable plastics material according to claim 11, wherein the content of cellulose ester makes up at least 90% by weight.

24. A photodegradable plastics material with a content of cellulose esters and optionally additives, characterised in that the photodegradable plastics material contains a photocatalytically active carbon-modified titanium dioxide dispersed therein; and the carbon-modified titanium dioxide is carbon-doped on its surface.

25. A photodegradable plastics material with a content of cellulose esters and optionally additives, characterised in that the photodegradable plastics material contains a photocatalytically active carbon-modified titanium dioxide dispersed therein; wherein the material is a moulded body in the form of a deep-drawn film.

* * * * *